3,176,024
PREPARATION OF CHLORO-PHTHALANES
Hans Feichtinger, Dinslaken, and Hanswerner Linden, Oberhausen-Holten, Germany, assignors to Ruhrchemie Aktiengesellschaft, Oberhausen-Holten, Germany, a German corporation
No Drawing. Filed Nov. 30, 1962, Ser. No. 241,136
Claims priority, application Germany, Dec. 8, 1961, R 31,647
5 Claims. (Cl. 260—346.2)

This invention relates to fungicidal materials and more particularly to 4,5,6,7 - tetrachloro-4,7-endoxo-4,7,8,9-tetrahydrophthalane derivatives having fungicidal activity.

The production of 4,5,6,7-tetrachloro-4,7-endoxo-4,7,8,9-tetrahydrophthalane by Diels Alder addition of tetrachlorofurane to 2,5-dihydrofurane is known. (U.S. Patent 2,882,199) and proceeds as follows:

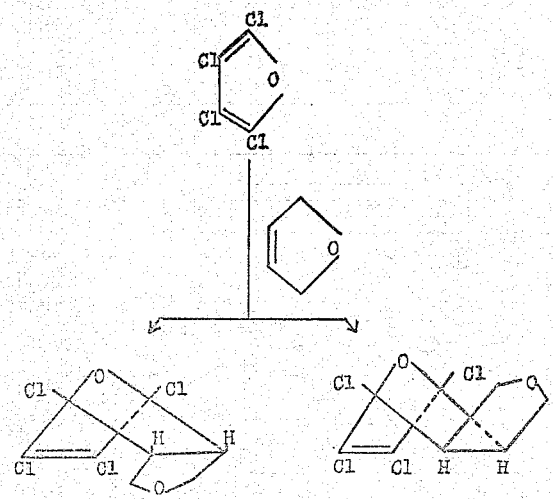

Melting Point 103–104° C.   Melting Point 105–106° C.

The product of the Diels Alder synthesis is accordingly a mixture of compounds. It has been proposed previously to treat a mixture of the endo-and-exo-forms of 4,5,6,7-tetrachloro-4,7-endoxo-4,7,8,9-tetrahydrophthalane with about 30–39% hydrochloric acid at elevated temperatures and elevated pressures whereby the mixture of the endo- and-exo-forms of 4,5,6,7-tetrachloro-4,7-endoxo-4,7,8,9-tetrahydrophthalane is converted into 4,5,6-trichloro-7-hydroxy-phthalane in good yields. The 4,5,6-trichloro-7-hydroxy-phthalane is characterized by an exceptionally high fungicidal activity and is extremely valuable for use in inhibiting or fully suppressing the growth of many fungi.

A disadvantage of the hydrochloric acid treatment process is that the reaction product which is thereby obtained contains a small amount of dark colored by-products, which must be separated in a subsequent purification step. The hydrochloric acid treatment has further disadvantages, it can only be performed in hydrochloric acid resistant pressure vessels which have, for instance, been constructed with glass, enamel, tantalum, or Teflon-linings.

This invention has as an object a simple and practical method for production of fungicidal materials from mixtures of the endo-and exo-forms of 4,5,6,7-tetrachloro-4,7-endoxo-4,7,8,9-tetrahydrophthalane avoiding the disadvantages of the heretofore available methods.

A further object is a method for the preparation of 4,5,6 - trichloro - 7 - hydroxy-phthalane, 5,6-dichloro-8,9-dihydrophthalochinones (4,7) and 5,6-dichloro-4,7-dihydroxy-phthalane.

A still further object is at method of treating a mixture of the endo-and-exo-forms of 4,5,6,7-tetrachloro-4,7-endoxo-4,7,8,9-tetrahydrophthalane to produce 4,5,6-trichloro-7-hydroxy-phthalane, 5,6-dichloro-8,9 - dihydrophthalochinone- (4,7) and 5,6-dichloro-4,7-dihydroxy-phthalane.

Other objects will appear hereinafter.

These objects are accomplished by treating a mixture of the stereoisomeric forms of 4,5,6,7-tetrachloro-4,7-endoxo-4,7,8,9-tetrahydrophthalane with sulfuric acid having a concentration of 70 to 98% and preferably 90 to 98% by weight to thereby produce 4,5,6-trichloro-7-hydroxy-phthalane, 5,6-dichloro-8,9-dihydrophthalochinone-(4,7) and 5,6-dichloro-4,7-dihydroxy-phthalane singly or in any admixture.

Thus, a ring rupture at the endocyclic connected oxygen atoms is effected in accordance with the invention.

It has been found in accordance with the invention that the present treatment with sulfuric acid results in the production of fungicidal compounds of exceptionally high activity.

If the treatment of sulfuric acid is carried out at —10 to 100° C. and preferably at temperatures of between 10 and 50° C., a vigorous evolution of hydrochloric acid occurs. The reaction proceeds as follows:

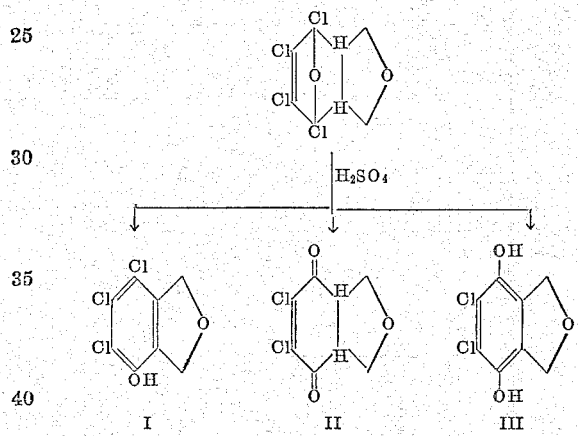

After termination of the evolution of the hydrochloric acid, the reaction mixture is immediately diluted with ice, resulting in the formation of a solid reaction product which can be separated readily by filtration.

The solid reaction product need not necessarily be separated into its separate components following the sulfuric acid treatment but can be used per se or after a conventional formulation as a fungicide.

On processing the reaction mixture, solid substances are obtained comprising as noted above 4,5,6-trichloro-7-hydroxyphthalane (I) having a melting point of 227.5 to 228° C., 5,6-dichloro-8,9-dihydrophthalochinone-(4,7) (II) having a melting point of 135.5 to 135.7° C. and 5,6-dichloro-4,7-dihydroxyphthalane (III) having a melting point of 243–244° C. Depending on the specific reaction temperature, reaction time and acid concentration, more or less of the 4,5,6-trichloro-7-hydroxy-phthalane is obtained, but it is always obtained admixed with compounds II and III. Compounds II and III are new materials and are themselves characterized by high fungicidal activity. Each of the compounds II and III may be used per se or in any desired conventional formulation or admixture as a fungicide.

In accordance with the invention, it has further been found that it is possible to convert a mixture of the endo- and exo-forms of 4,5,6-tetrachloro-4,7-endoxo-4,7,8,9-tetrahydrophthalane quantitatively into 4,5,6-trichloro-7-hydroxy-phthalane by treating the mixture with sulfuric acid at temperatures below —10° C. and preferably at temperatures of —15 to —35° C. The action of the sulfuric acid upon the starting mixture is continued until a homogeneous solution is obtained, a colorless oil of the empirical formula $C_8H_8O_3Cl_4$ is isolated and the same is permitted to stand at least at ambient temperature until it has quantitatively been converted with evolution of hydrochloric acid, and water into 4,5,6-trichloro-7-hydroxy-phthalane. The conversion is complete if the evolution of the stoichiometric amount of hydrochloric acid has taken place.

The conversion is expediently carried out by dissolving the starting mixture in 90 to 98% sulfuric acid with stirring at a temperature of from −15 to −35° C. for several hours. No hydrochloric evolution is thereby observed but only a homogenization of the reactants. Following completion of this treatment step, the homogeneous reaction solution is diluted by addition of ice thereto. The sulfuric acid solution is extracted with ether at a temperature of less than about 10° C., the ether extract neutralized with sodium bicarbonate solution, dried over calcined sodium sulfate, filtrated and concentrated. After evaporation of the ether, a colorless oil remains which corresponds according to analysis and chemical behavior to 4,5,6,7-tetrachloro-4,7-dihydroxy-4,7,8,9-tetrahydrophthalane.

The oil which is so obtained is unstable and is converted during the standing at ambient temperature into a white solid substance. Because of the geminal arrangement of the hydroxyl group and the halogen atom on the same C-atom in both the 4- and 7-positions, the intermediary product stabilizes with liberation of 1 mol of water and 1 mol of hydrochloric acid under aromatization in quantitative reaction to 4,5,6-trichloro-7-hydroxyphthalane.

The reaction takes place according to the following reaction scheme in which the two stereoisomeric forms of the starting material are represented by a single projection formula:

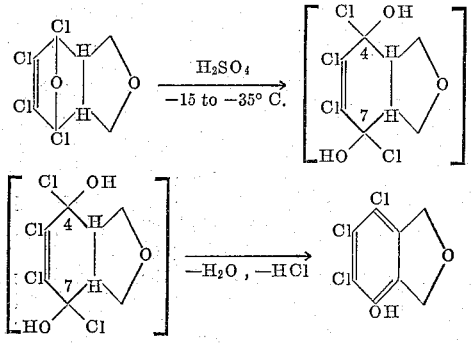

The same reaction takes place, if the 4,5,6,7-tetrachloro-4,7-dihydroxy-4,7,8,9-tetrahydrophthalane is dissolved in the organic solvent (as obtained in the extracting of the sulfuric acid solution with ether). For example, 4,5,6-trichloro-7-hydroxy-phthalane can be obtained by evaporation from the ethereal solution after the same has been permitted to stand at ambient temperature for 12 to 24 hours.

In contradistinction to the first noted method of treating the 4,5,6,7-tetrachloro-4,7-endoxo-4,7,8,9-tetrahydrophthalane with concentrated sulfuric acid at temperatures below −10° C., a uniform, clear white 4,5,6-trichloro-7-hydroxyphthalane is directly obtained which, after washing with water and drying can be used without further purification as a fungicidally active substance or as an intermediate for use in organic syntheses.

The invention is further illustrated by the following examples, but it is not intended that the invention is to be limited thereby.

EXAMPLE 1

60.0 g. of a pulverized mixture of the endo and the exo-forms of 4,5,6,7-tetrachloro-4,7-endoxo-4,7,8,9-tetrahydrophthalane were added to 600 ml. 90% sulfuric acid at ambient temperature. A slight increase in temperature was observed along with an instantaneously and violent evolution of hydrochloric acid. After termination of the reaction, the yellowish brown contents of the flask were poured onto crushed ice. The resulting crystalline solid was filtered off, washed with water and dried, yielding 48.0 g. of a raw product having a fungicidal activity.

EXAMPLE 2

50 ml. 98% sulfuric acid were added at −5° C. to 10.0 g. of 4,5,6,7-tetrachloro-4,7-endoxo-4,7,8,9-tetrahydrophthalanes contained in an open vessel and the resultant reaction mixture was thoroughly stirred. After approximately half an hour, the phthalane was dissolved. Thereafter, crushed ice was added to the reaction mixture and a yellow solid resulted which was filtered off and taken up in ether. Following neutralization and drying, the solution was evaporated. 7.8 g. of a crystallizate were obtained which, after redissolution in ethyl acetate produced 7.0 g. of 4,5,6-trichloro-7-hydroxyphthalane having a melting point of 227.5 to 228° C. During the dissolution, HCl was evolved.

$C_8H_5O_2Cl_3$ (239.49):

|  | Calculated | Found |
|---|---|---|
| C | 40.14 | 40.36 |
| H | 2.10 | 2.20 |
| Cl | 44.40 | 44.31 |
| O | 13.36 | 13.76 |

Reaction with phenylisocyanate in absolute benzolic solution resulted in the production of a phenylurethane having a melting point of 179 to 180.5 C.

The aqueous sulfuric acid filtrate remaining after filtering off the yellow solid was extracted with ether, the ethereal extract was neutralized with sodium bicarbonate solution and dried over calcined sodium sulfate. After filtration and concentration, 1.0 g. of a yellow substance was obtained, which after recrystallization yielded 0.8 g. 5,6-dichloro-8,9-dihydrophthalochinone-(4,7). The aforesaid pale yellowish colored compound had a melting point of 135.5 to 135.7° C.

$C_8H_6O_3Cl_2$ (221.05):

|  | Calculated | Found |
|---|---|---|
| C | 43.47 | 43.23 |
| H | 2.74 | 2.68 |
| Cl | 32.07 | 32.25 |
| O | 21.72 | 21.83 |

EXAMPLE 3

10.0 g. 4,5,6,7-tetrachloro-4,7-endoxo-4,7,8,9-tetrahydrophthalane were treated with 100 ml. 98% sulfuric acid for approximately one minute at 20 to 30° C. and thereafter diluted with crushed ice. The reaction mixture so obtained was extracted with ether, the extract twice washed with water and dried over calcined sodium sulfate. 1.5 g. of 5,6-dichloro-8,9-dihydrophthalochinone-(4,7) precipitated from the ethereal solution which had been concentrated but not fully evaporated to dryness. From the residual mother liquor 6.2 g. of 4,5,6-trichloro-7-hydroxy-phthalane was recovered.

EXAMPLE 4

10.0 g. 4,5,6,7-tetrachloro-4,7-endoxo-4,7,8,9-tetrahydrophthalane were treated with 100 ml. 98% sulfuric acid at 20 to 30° C. in an open vessel. After stirring for 5 minutes, crushed ice was added to the reaction mixture. The precipitate formed was separated from the liquor by suction and washed sulfuric acid free with water. There were recovered 7.0 g. of a solid from which 2.0 g. of 5,6-dichloro-4,7-dihydroxy-phthalane-hydrate were recovered by extraction thereof with hot water. By ether treatment of the aqueous mother liquor as well as of the sulfuric acid filtrate recovered in the treatment of the raw product, a further 1.8 g. of the same compound could be isolated. After drying the hydrate and recrystallizing from chloroform, pure 5,6-dichloro-4,7-dihydroxy-phthalane having a melting point of 243 to 244° C. was obtained.

$C_8H_6O_3Cl$ (221.05):

|   | Calculated | Found |
|---|---|---|
| C | 43.47 | 43.22 |
| H | 2.74 | 2.64 |
| O | 21.72 | 21.50 |
| Cl | 32.07 | 32.20 |

The 5,6-dichloro-4,7-dihydroxy-phthalane was reacted with phenyl isocyanate to form the bis-phenylurethane melting at 230 to 231.5° C.

From the residue which was insoluble in water, 2.5 g. 4,5,6-trichloro-7-hydroxyphthalane was obtained by recrystallization.

EXAMPLE 5

250 ml. 94.3% sulfuric acid were added to 25.0 g. 4,5,6,7 - tetrachloro-4,7-endoxo-4,7,8,9-tetrahydrophthalane at a temperature of 35° C. The reaction mixture was continuously stirred, HCl being violently liberated, a slight increase in temperature resulting thereby. After a reaction time of 15 minutes, the temperature decreased. The reaction mixture was then slowly poured into ice water and a pale yellow precipitate was instantaneously formed which, after having been washed acid free and dried, yielded 17.3 g. of a crystalline substance having a melting range of 160 to 200° C. and consisting essentially of a mixture of 4,5,6-trichloro-7-hydroxy-phthalane and 5,6-dichloro-4,7-dihydroxy-phthalane. Both substances were separated by fractional crystallization and identified specifically as 4,5,6-trichloro-7-hydroxy-phthalane and 5,6-dichloro-4,7-dihydroxy-phthalane.

EXAMPLE 6

To 10.0 g. 4,5,6,7-tetrachloro-4,7-endoxo-4,7,8,9-tetrahydrophthalane there were added 100 ml. of 88% sulfuric acid at a temperature of 40° C. After the violent development of HCl had ceased, crushed ice was added to the yellowish-red reaction mixture and a precipitate was thereby formed. The precipitate was heated with the aqueous sulfuric acid solution until the liquid began to boil and thereafter was subjected to filtration. The filtrate recovered was allowed to cool and was processed by further filtration and extraction with ether. 6.9 g. of 5,6-dichloro-4,7-dihydroxy-phthalane were thereby obtained. The residue remaining from the filtrate was difficultly soluble in water and yielded after recrystallization from ethylacetate 1.0 g. 4,5,6-trichloro-7-hydroxyphthalane.

EXAMPLE 7

27.6 g. (0.10 mol) of a finely pulverized mixture of the endo-and the exo-form of 4,5,6,7-tetrachloro-4,7-endoxo-4,7,8,9-tetrahydrophthalane were added to 100 ml. 98% sulfuric acid contained in an open 250 ml. Erlenmeyer-flask under stirring using a magnetic stirrer. The acid was kept at −20 to −25° C. by means of an ethyl alcohol carbon dioxide refrigerating bath. After approximately 1 hour, the solid substance added to the sulfuric acid was dissolved and a colorless, homogeneous solution formed. In order to complete the reaction, the solution was maintained with stirring for 2 hours at the above-noted temperature. Thereafter the reaction mixture was poured onto crushed ice and the resulting sulfuric acid mixture extracted with ether. After drying over calcined sodium sulfate, filtration and evaporation of the ether, 29.4 g. of a limpid, colorless oil, having a chlorine content of 47.98% was obtained. The chlorine content of the 4,5,6,7 - tetrachloro-4,7-dihydroxy - 4,7,8,9 - tetrahydrophthalane having the empirical formula $C_8H_8O_3Cl_4$ was calculated at 48.24%.

The oil so obtained was slowly transformed on standing for 24 hours into a white, crystalline substance during which time HCl and water were liberated. After being washed with water, the white crystalline substance had a melting point of 215–222° C. Following a single recrystallization from ethyl acetate, 23.7 g. 4,5,6-trichloro-7-hydroxyphthalane having a melting point of 227.5 to 228° C. were obtained. The yield amounted to 99% of the theoretically calculated yield.

The fungicidal activity of the product comprising 4,5,6,6-trichloro-7-hydroxyphthalane (I), 5,6-dichloro-8,9-dihydrophthalochinone-(4,7) (II) and 5,6-dichloro-4,7-dihydroxy-phthalane (III) prepared in accordance with the invention is shown in Table I, that of the novel compounds II and III of the invention in Tables II to V. The fungicidal effect of the product as a whole, as well as of the individual compounds II and III respectively was determined according to the standard test of the American Phytopathological Society (Phytopathology, vol. 33, p. 627 to 632 (1943) and vol. 37, p. 354 to 356 (1947)).

In the tables, the inhibition of spore germination of various fungi is given as a function of the dilution of the product as a whole as well as of the 5,6-dichloro-8,9-dihydrophthalochinone-(4,7) (II) and of the 5,6-dichloro-4,7-dihydroxy-phthalane (III). The numbers as set out represent the percentage of ungerminated spores counted.

Table I

| Spores of— | Percent inhibition of germination at dilution | | | |
|---|---|---|---|---|
| | 0.1 | 0.01 | 0.001 | 0.0001 |
| *Alternaria tenuis* | 100 | 100 | 100 | 25 |
| *Botrytis cinerea* | 100 | 100 | 100 | 32 |
| *Sclerotinia fructicola* | 100 | 100 | 100 | 100 |
| *Macrosporium sarcinaeforme* | 100 | 100 | 55 | 0 |

Table II

[*Alternaria tenuis* (root rot of young tobacco plants)]

| Compound | Percent inhibition of germination at dilution | | | |
|---|---|---|---|---|
| | 0.01 | 0.001 | 0.0001 | 0.00001 |
| II | 100 | 100 | 74 | 3 |
| III | 100 | 100 | 73 | 5 |

Table III

[*Botrytis cinerea* (grey mould)]

| Compound | Percent inhibition of germination at dilution | | | |
|---|---|---|---|---|
| | 0.01 | 0.001 | 0.0001 | 0.00001 |
| II | 100 | 100 | 90 | 0 |
| III | 100 | 100 | 24 | 0 |

Table IV

[*Sclerotinia fructicola* (brown rot of fruits)]

| Compound | Percent inhibition of germination at dilution | | | |
|---|---|---|---|---|
| | 0.01 | 0.001 | 0.0001 | 0.00001 |
| II | 100 | 100 | 100 | 15 |
| III | 100 | 100 | 100 | 10 |

*Table V*

[*Macrosporium sarcinaeforme* (Blattschütte)]

| Compound | Percent inhibition of germination at dilution | | |
|---|---|---|---|
| | 0.01 | 0.001 | 0.0001 |
| II | 100 | 49 | 0 |
| III | 100 | 30 | 0 |

The new compounds produced in accordance with the invention are useful additionally for combating other fungi not indicated above as, for instance, dermatophytes as well as for combating bacteria. They are also valuable as intermediates for various syntheses.

The product as a whole or the novel compounds 5,6-dichloro-8,9-dihydrophthalochinone-(4,7) (II) and 5,6-dichloro-4,7-dihydroxy-phthalane (III) may be used in the conventional manner for preparing fungicidal compositions, namely by incorporating a fungicidal effective quantity thereof in liquid or solid diluents well known in the art. Thus for example, they may be formed into a a fungicidal spray by dissolving or dispersing in the conventional liquid carrier materials for fungicides, eventually with addition of commercially available emulsifiers, dispersants, detergents or adhesives, further they may be formed into an aerosol in the conventional manner or into dusting powder by admixture with a commercially available inert solid carrier material.

What is claimed is:

1. Process for the production of fungicidally active derivatives of 4,5,6,7-tetrachloro-4,7-endoxo-4,7,8,9-tetrahydrophthalane which comprises contacting a mixture of the endo- and exo- forms of 4,5,6,7-tetrachloro-4,7-endoxo-4,7,8,9-tetrahydrophthalane with 70–98% sulfuric acid at a temperature of −35 to 100° C. and recovering the fungicidally active 4,5,6,7-tetrachloro-4,7-endoxo-4,7,8,9-tetrahydrophthalane derivatives thereby formed.

2. Process for the production of fungicidally active derivatives of 4,5,6,7-tetrachloro-4,7-endoxo-4,7,8,9-tetrahydrophthalane which comprises contacting a mixture of the endo- and exo-forms of 4,5,6,7-tetrachloro-4,7-endoxo-4,7,8,9-tetrahydrophthalane with 70 to 98% sulfuric acid at a temperature of between −10 to +100° C. and recovering the 4,5,6-trichloro-7-hydroxyphthalane, 5,6-dichloro-8,9-dihydrophthalochinone (4,7) and 5,6-dichloro-4,7-dihydrophthalane thereby formed.

3. Process for the production of a fungicidally active derivative of 4,5,6,7-tetrachloro-4,7-endoxo-4,7,8,9-tetrahydrophthalane which comprises contacting a mixture of the endo- and exo-forms of 4,5,6,7-tetrachloro-4,7-endoxo-4,7,8,9-tetrahydrophthalane with 70–98% sulfuric acid at a temperature of below −10° C., isolating from the resulting homogeneous solution the compound having the empirical formula $C_8H_8O_3Cl_4$, converting the said compound into 4,5,6-trichloro-7-hydroxyphthalane by maintaining the said compound at, at least ambient temperature for from about 12 to about 24 hours and recovering the 4,5,6-trichloro-7-hydroxy-phthalane thereby formed.

4. 5,6-dichloro-8,9-dihydrophthalochinone-(4,7).

5. 5,6-dichloro-4,7-dihydroxyphthalane.

References Cited in the file of this patent

UNITED STATES PATENTS

| | | |
|---|---|---|
| 2,591,588 | Mowry | Apr. 1, 1952 |
| 2,861,919 | Gilbert | Nov. 25, 1958 |
| 2,879,275 | Feichtinger et al. | Mar. 24, 1959 |
| 2,881,187 | Feichtinger et al. | Apr. 7, 1959 |